United States Patent
Grünewald et al.

[11] 3,880,615
[45] Apr. 29, 1975

[54] PROCESS FOR REGENERATING ABSORBENT SOLUTIONS USED TO PURIFY GASES

[75] Inventors: Gerhard Grünewald, Mainz-Bretzenheim; Gerhard Hochgesand, Neu-Isenburg, both of Germany

[73] Assignee: Metallgesellschaft Aktiengesellschaft, Frankfurt am Main, Germany

[22] Filed: May 16, 1973

[21] Appl. No.: 360,855

[30] Foreign Application Priority Data
May 30, 1972 Germany............................ 2226215

[52] U.S. Cl. .............................. 55/44; 55/68; 55/73
[51] Int. Cl............................................. B01d 53/14
[58] Field of Search........................... 55/42–44, 48, 55/51, 68, 73, 55

[56] References Cited
UNITED STATES PATENTS
| | | | |
|---|---|---|---|
| 2,504,429 | 4/1950 | Latchum................................ | 55/43 |
| 3,188,287 | 6/1965 | Hull....................................... | 55/44 |
| 3,324,627 | 6/1967 | Kohrt..................................... | 55/51 |
| 3,505,784 | 4/1970 | Hochgesand et al. ................. | 55/68 |

Primary Examiner—Charles N. Hart
Attorney, Agent, or Firm—Burgess, Dinklage & Sprung

[57] ABSTRACT

An absorbent solution such as N-methylpyrrolidone is used to scrub acid components such as hydrogen sulfide at ambient temperatures from gases under pressure. The laden absorbent solution is regenerated by pressure relieving the laden solution in a plurality of stages and stripping the pressure-relieved solution in a regenerating zone with a gas. The stripping gas used in the regenerating zone is formed by a preliminary pressure relief of the laden solution to an intermediate pressure between the absorption pressure and ambient pressure. This stripping gas is scrubbed before entering the regenerating zone with a branch stream of fully regenerated absorbent.

3 Claims, 1 Drawing Figure

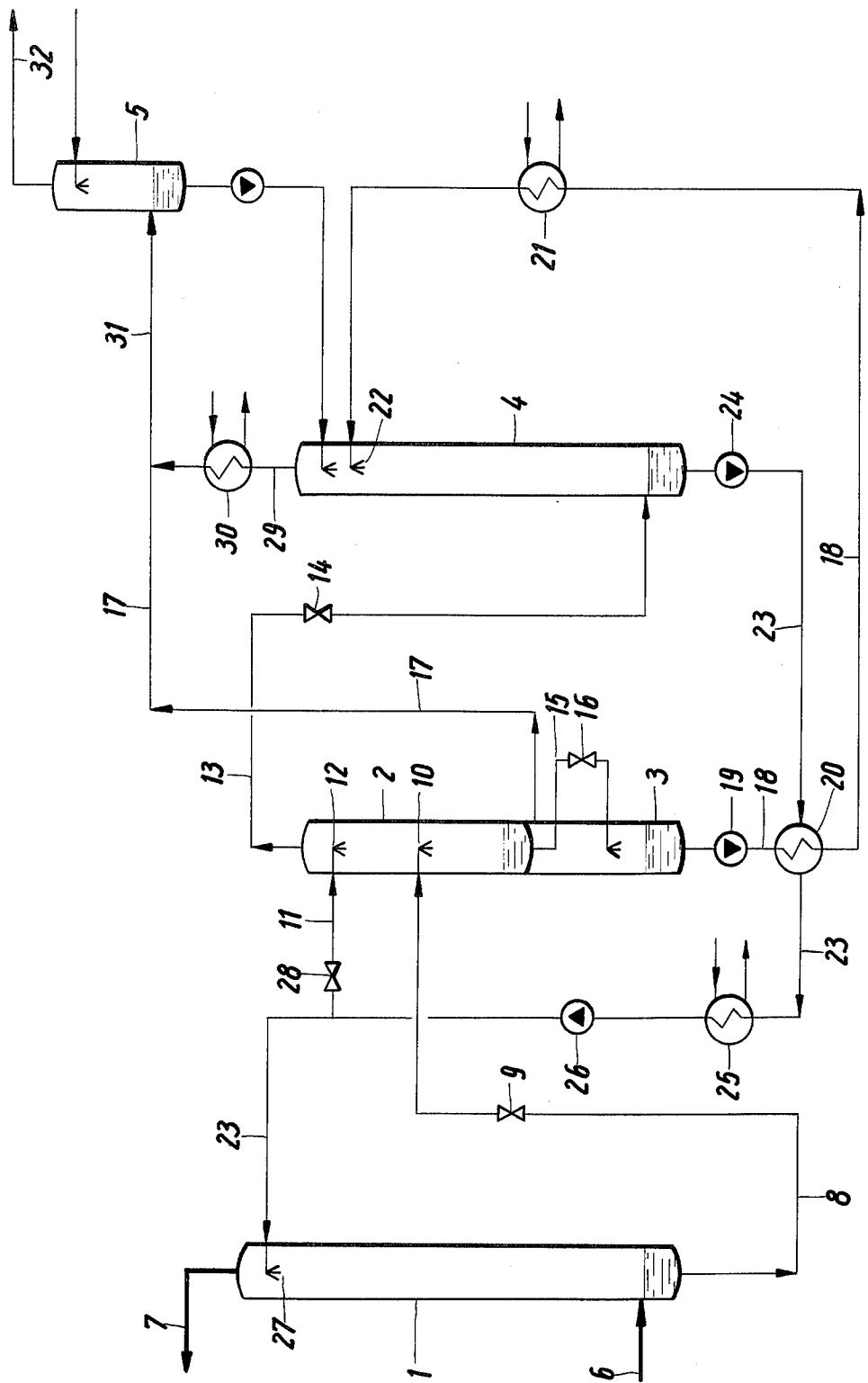

PROCESS FOR REGENERATING ABSORBENT SOLUTIONS USED TO PURIFY GASES

BACKGROUND

This invention relates to a process for regenerating laden absorbent solutions resulting from a gas scrubbing operation carried out with an absorbent at ambient temperatures and under elevated pressures.

It is known to scrub fuel gases or synthetic gases with physical absorbents under superatmospheric pressure in order to remove acid components, particularly hydrogen sulfide, sulfur oxysulfide and carbon dioxide.

The absorbates are dissolved in the absorbent independence on their partial pressure and are released therefrom after a pressure relief to a lower pressure.

To expel the dissolved gas components as completely as possible from such laden physical absorbents and to enable a subsequent re-use of the absorbent in the absorption unit, the laden physical absorbent is regenerated by being pressure-relieved to atmospheric or subatmospheric pressure and thereafter stripped either with an inert gas or, after a suitable temperature rise, with the vapor of the absorbent.

One of the oldest physical gas-scrubbing process is the pressure water scrubbing process, which is preferably used to scrub large amounts of carbon dioxide from gases. The gas under pressure is scrubbed with water, and the $CO_2$-containing water is pressure-relieved and then regenerated by bubbling air therethrough.

In more recent processes, low-boiling organic compounds, such as methanol, acetone, heptane, toluene and the like, have been used as absorbents and the absorption is carried out at low temperatures of, e.g., $-10°$ to $-70°C$. The regeneration may often be carried out in the same temperature range in that the absorbent is pressure-relieved and is stripped with an inert gas. Air or pure gas may be used as a stripping agent under certain conditions.

In cases where the gas to be purified is under a sufficiently high pressure, higher-boiling organic compounds have also been used as an absorbent. Compounds known for this purpose include ethylene glycol, propylene carbonate, N-methylpyrrolidone, polyethylene glycol dimethyl ether, and others.

Some of these absorbents have a clearly selective absorption capacity for hydrogen sulfide in preference to carbon dioxide. If the sulfur compounds are selectively scrubbed from fuel gases or synthesis gases, the regeneration of the laden absorbent can be carried out to produce an exhaust gas rich in hydrogen sulfide from which elementary sulfur can be recovered by the Claus process.

DOS 1,494,809 discloses a process for scrubbing gases under pressure with N-methylpyrrolidone to remove carbon dioxide except for very low residual concentrations. In that process, the laden absorbent is fully regenerated without using heat merely by being pressure-relieved to the ambient pressure and stripped with an inert gas or with air.

When hydrogen sulfide is scrubbed from a gas in this manner, air cannot in general be used as a stripping gas because the atmospheric oxygen would oxidize the hydrogen sulfide which is dissolved in the absorbent and elementary sulfur would thus be produced. This may clog parts of the plant, or corrosive sulfur-oxygen compounds may be formed. If inert gases are used as a stripping gas, care must be taken to see that these inert gases do not unduly dilute the hydrogen sulfide which has been expelled from the absorbent because the subsequent processing to produce elementary sulfur or sulfuric acid would be burdened to such an extent by such dilution that the processing is no longer economical. In view of these restrictions, it is often more desirable to use pure gas as a stripping gas particularly because the same meets two important requirements. Being dry, it does not introduce undesired moisture into the process. Besides, it is available under a sufficiently high initial pressure.

It is known and described in DOS 1,494,809 to subject a physically acting absorbent which has been laden under pressure to a pressure relief in one or more stages before it is regenerated under atmospheric or subatmospheric pressure. In the first pressure-relief stage, the pressure is relieved from the absorption pressure to a lower pressure, which is still superatmospheric but is so low that the useful gas components which have also been dissolved in the absorbent and which would be desirable in the pure gas are released. These components are compressed from this medium pressure back into the raw gas or are used entirely or in part as a fuel gas, as may be required.

SUMMARY

It has now been found that the gas which is released in one of the first intermediate pressure-relief stages may be used as a stripping gas in the subsequent regeneration carried out under atmospheric or subatmospheric pressure because the gas is under the pressure required for this purpose and does not introduce foreign matter, particularly moisture, into the absorbent.

For its use as a stripping gas, this gas must be free of the absorbates, which should be expelled from the absorbent as completely as possible by the regeneration. To meet this requirement, the pressure relief is conducted in known manner in a plurality of stages. For instance, a scrubbing column is provided, which is disposed over the first pressure-relief stage and in which the gas released by the preliminary pressure relief is scrubbed with completely regenerated absorbent. The gas which has thus been scrubbed is fed as stripping gas into the sump of the regenerating tower. The partly pressure-relieved absorbent is combined with the small amount of completely regenerated absorbent which has been fed to the pressure relief stage and the mixture enters the second pressure relief, where it is degasified under atmospheric or subatmospheric pressure. The absorbent which has thus been predegasified is fed to the top of the regenerating column. The exhaust gases from the second pressure relief stage and from the regenerating column are combined, they may be scrubbed with water and are then discharged for further use.

The pressure relief may be conducted in even more stages. For instance, the gas which has been flashed off in the first stage is recompressed and is recycled to the raw gas so that the gas which has been flashed off in the second stage is scrubbed with fully regenerated absorbent and is used as a stripping agent in the last pressure relief stage.

The invention thus relates to a process for regenerating a laden absorbent solution which is produced when acid components are scrubbed at ambient temperature from natural gas or commercial synthesis gases and fuel gases under pressure with a physical absorbent at ambient temperature, wherein the regeneration is effected by subjecting the solution to a pressure relief in a plurality of stages and stripping the pressure-relieved solution with a gas.

The process according to the invention is characterized in that the stripping gas consists of the gas which is flashed off as a result of a preliminary pressure relief to a medium pressure between the absorption pressure and ambient pressure, and the stripping gas before being fed into the regenerating tower is scrubbed with a branch stream of the absorbent which has been fully regenerated as far as the components to be scrubbed from the raw gas are concerned.

DESCRIPTION OF THE DRAWING

The accompanying drawing is a schematic flow diagram of suitable apparatus for carrying out the process of the invention.

DESCRIPTION

The absorbent which has been used to scrub the exhaust gas coming from the preliminary pressure relief stage is combined with the absorbent which has been partly pressure-relieved in said stage and the resulting mixture is conducted through another pressure relief stage to the regenerating tower.

Because the rate at which stripping gas is required to regenerate the pressure-relieved solution by stripping is reduced at the temperature of said solution is increased, the pressure-relieved absorbent may be preheated before it is fed to the top of the regenerating tower. As a result, the rate at which exhaust gas to be used as stripping gas is produced in the first pressure relief stage and the rate at which stripping gas is required in the regenerating tower can be matched.

The drawing shows by way of example a flow scheme of a plant in which the process according to the invention is carried out and which comprises two pressure relief stages.

The plant comprises essentially an absorption tower 1 which is operated under pressure, a pressure relief unit comprising two stages 2 and 3, and a regenerating tower 4.

In a scrubbing column 5, which is fed with water, the combined exhaust gases from the regenerating tower 4 are scrubbed so that entrained absorbent vapors are retained.

The gas to be purified is fed through conduit 6 under pressure into the absorption tower 1. The purified gas is discharged from the top of the absorption tower 1 through conduit 7.

From the sump of the absorption tower, the absorbent which has been laden under pressure is fed into the first stage 2 of the pressure relief unit through a conduit 3, which comprises a pressure relief valve 9.

The first pressure relief stage 2 consists of a reabsorber. The conduit 8 terminates in a distributor 10, which is disposed in the lower half of the reabsorber. The liquid is degasified as it emerges from this distributor, and it collects in the sump whereas the flashed-off gas flows upwardly in a countercurrent to a stream of fully regenerated scrubbing agent, which is fed from a conduit 11 through a distributor 12 disposed in the top portion of the reabsorber. The absorbent absorbs from the gas the small amounts of the gas components which are not desired in the pure gas and which are also released by the first pressure relief. The absorbent laden with these gas components is combined in the sump with the partly pressure-relieved absorbent from the conduit 8.

A gas consisting only of pure gas components escapes from the first expansion stage 2 through a conduit 13, which incorporates a pressure relief valve 14, and is fed as a stripping gas into the sump of the regenerating tower 4.

The absorbent which has been pre-degasified by a partial pressure relief flows from the sump of the reabsorber constituting the first pressure relief stage 2 through a conduit 15, which incorporates the pressure relief valve 16, into the second pressure relief stage 3. The gases which are released here are discharged through conduit 17. The absorbent which has now been pressure-relieved to ambient pressure and has been considerably degasified is withdrawn from the sump of the second expansion stage 3 through the conduit 18 and by means of a pump 19 is fed through the heat exchanger 20 and a heater 21 to the top of the regenerating tower 4. The conduit 18 terminates in a distributor 22, which is disposed in the regenerating tower 4 and which distributes the liquid among the internal fixtures which are contained in the regenerating tower and promote the exchange of materials. As a result, the liquid trickles opposite to the rising stripping gas. The fully regenerated absorbent is withdrawn through conduit 23 from the sump of the regenerating tower 4 and by means of a pump 24 is fed through a heat exchanger 20 and a cooler 25 to a high-pressure pump 26, which pressurizes the fully regenerated absorbent to the operating pressure of the absorption stage. The conduit 23 terminates in a distributor 27, which is disposed in the top part of the absorption tower 1. A branch stream of the fully regenerated absorbent is diverted from the high-pressure portion of the conduit 23 by the conduit 11, which incorporates a valve 28, and said branch stream is used as a scrubbing agent in the reabsorber 2.

The exhaust gas from the regenerating tower 4 is withdrawn through a conduit 29 and a condenser 30 and is combined with the exhaust gas coming through conduit 17 from the second pressure relief stage 3. The combined exhaust gases are fed through conduit 31 into the water scrubber 5 and from the latter are conducted in a conduit 32 for further use.

Before the pressure-relieved absorbent enters the regenerating tower, it is preheated in the heater 21 to the temperature which is required in view of the rate at which stripping gas is available from the first pressure relief stage. This preheating begins in the heat exchanger 20, in which the absorbent which has been pressure-relieved and has thus been cooled receives the sensible heat which is still contained in the fully regenerated absorbent. In the cooler 25, the fully regenerated absorbent is cooled to the operating temperature of the absorption tower.

The invention will be explained more fully with reference to the accompanying examples.

EXAMPLE 1

Scrubbing gases having high $H_2S$ and $CO_2$ contents with N-methylpyrrolidone to remove $H_2S$ Natural gas at a rate of 100,000 standard cubic meters per hour is to be scrubbed to remove $H_2S$ except for a residue of 10 ppm.

| | | |
|---|---|---|
| Gas pressure | 75 kg/cm² | absolute pressure |
| Temperature | 10°C | |
| Raw gas analysis | H₂S | 7% by volume |
| | CO₂ | 30% by volume |
| | CH₄ | 63% by volume |

The H$_2$S should be scrubbed off as selectively as possible so that it can subsequently be reacted to form elementary sulfur in a Claus process plant. The purified natural gas is burnt in a power plant to produce steam.

To remove the H$_2$S to the desired final content, the gas is scrubbed in the absorber with N-methyl pyrrolidone, which is supplied at ambient temperature at a rate of 125 standard cubic meters per hour.

From the sump of the absorber, the laden scrubbing agent flows to the first pressure relief stage, in which under a pressure of about 35 kilograms per square centimeter absolute pressure a major part of the coabsorbed CH$_4$ is desorbed. The desorbed CH$_4$ is recycled by a recompressor into the raw gas.

| | | |
|---|---|---|
| Rate of recompressed gas: | | about 2700 standard cubic meters per hour |
| Analysis: | H₂S | 6% by volume |
| | CO₂ | 47% by volume |
| | CH₄ | 47% by volume |

In a second pressure relief stage, the scrubbing agent is then pressure-relieved to about 15 kilograms per square centimeter absolute pressure. The gas which has been released is scrubbed in the reabsorber with scrubbing agent at a low rate to remove all H$_2$S. This gas is subsequently used as a stripping gas for the full regeneration of the scrubbing agent in the regenerator 4.

Gas flashed off under 15 kilograms per square centimeter absolute pressure:

| | | |
|---|---|---|
| Rate | 3500 standard cubic meters per hour | |
| Composition | H₂S | 15% by volume |
| | CO₂ | 72% by volume |
| | CH₄ | 13% by volume |

Gas left after the reabsorption:

| | | |
|---|---|---|
| Rate | 2500 standard cubic meters per hour | |
| Composition | CO₂ | 80% by volume |
| | CH₄ | 20% by volume |

N-methylpyrrolidone at a rate of about 30 cubic meters per hour is required for the reabsorption. Hence, the total rate of scrubbing agent to be regenerated amounts to 125 + 30 = 155 cubic meters per hour.

If stripping gas is available at a rate of 2500 standard cubic meters per hour, a temperature of about 130°C. is required for the regeneration of the scrubbing agent at said rate under a slightly superatmospheric pressure.

The Claus process feed gas consisting of the flashed-off gas and stripping gas has the following composition:

| | |
|---|---|
| H₂S | 53.4% by volume |
| CO₂ | 43.0% by volume |
| CH₄ | 3.6% by volume |
| | 100.0% by volume |

Being available at a rate of 13,000 standard cubic meters per hour, the gas can well be used as a Claus process feed gas.

EXAMPLE 2

Scrubbing gases having a low H$_2$S content with N-methylpyrrolidone to remove H$_2$S Raw gas at a rate of 100,000 standard cubic meters is to be scrubbed to remove H$_2$S except for a residual concentration of 5 ppm Raw gas

| | | |
|---|---|---|
| Pressure | | 75 kg/cm² absolute pressure |
| Temperature | | 10°C |
| Analysis | H₂S | 300 ppm |
| | CO₂ | 6% by volume |
| | N₂ | 4% by volume |
| | CH₄ | 89% by volume |
| | C₂ | 1% by volume |

The H$_2$S should be scrubbed off as selectively as possible and together with the methane and CO$_2$ which are also scrubbed off can be burnt in a steam boiler.

The pure gas is delivered as town gas.

To remove the H$_2$S, the gas is scrubbed in the absorber with N-methylpyrrolidone, which is supplied at a rate of about 75 cubic meters per hour and at a temperature of about 25°C.

The laden scrubbing agent flows from the sump of the absorber into the reabsorber and is pressure-relieved there to about 10 kilograms per square centimeter absolute pressure.

The gas which has thus been flashed-off at a rate of about 3400 standard cubic meters per hour has the following composition:

| | |
|---|---|
| H₂S | 0.1% by volume |
| CH₄ | 22.0% by volume |
| CO₂ | 75.0% by volume |
| C₂ | 2.9% by volume |
| | 100.0% by volume |

To remove all H$_2$S, this gas is scrubbed in the top part of the reabsorber with N-methylpyrrolidone at a rate of about 8 cubic meters per hour. Some CO$_2$ and CH$_4$ are absorbed at the same time so that gas which is free of H$_2$S is delivered at the top of the reabsorber at a rate of about 3200 standard cubic meters per hour and may be used for stripping.

| | | |
|---|---|---|
| Gas analysis | H₂S | 2 ppm |
| | CO₂ | 76% by volume |
| | C₁ | 22% by volume |
| | C₂ | 3% by volume |

The total rate of scrubbing agent amounting to 75 + 8 = 93 cubic meters per hour is then heated to 100°C. and may then be completely regenerated with the stripping gas which is available.

The regenerator is operated under a substantially atmospheric pressure and the fuel gas delivered thereby at a total rate of 5200 standard cubic meters per hour has the following composition:

| | |
|---|---|
| H₂S | 1.5% by volume |
| CO₂ | 42.0% by volume |

-Continued

| | |
|---|---|
| $C_1$ | 53.5% by volume |
| $C_2$ | 3.0% by volume |

What is claimed is:

1. Process for regenerating fully a laden absorbent solution produced when acid components are scrubbed at ambient temperatures from natural gas or commercial synthesis gases and fuel gases under pressure with a physical absorbent at ambient temperatures, which comprises subjecting said laden solution to a pressure relief in a plurality of stages and stripping the pressure-relieved solution in a regenerating zone with a gas, said stripping gas being formed by a preliminary pressure relief of the laden solution to a medium pressure between the absorption pressure and ambient pressure, and scrubbing said stripping gas before entering the regenerating zone with a branch stream of fully regenerated absorbent.

2. Process of claim 1 wherein absorbent used to scrub exhaust gas from the preliminary pressure relief stage is combined with absorbent partly pressure-relieved in said stage and the resulting mixture is fed to another pressure relief stage.

3. Process of claim 1 wherein the pressure-relieved absorbent is heated before being fed to the top of the regenerating zone.

* * * * *